(12) United States Patent  
Kim

(10) Patent No.: US 10,576,780 B2  
(45) Date of Patent: Mar. 3, 2020

(54) TIRE WHEEL AND METHOD FOR MANUFACTURING THE SAME

(71) Applicants: HYUNDAI MOTOR COMPANY, Seoul (KR); KIA MOTORS CORPORATION, Seoul (KR)

(72) Inventor: Juho Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/825,630

(22) Filed: Nov. 29, 2017

(65) Prior Publication Data

US 2019/0023066 A1 Jan. 24, 2019

(30) Foreign Application Priority Data

Jul. 21, 2017 (KR) .................. 10-2017-0092510

(51) Int. Cl.
| | |
|---|---|
| B60B 1/06 | (2006.01) |
| B60B 21/02 | (2006.01) |
| B60B 17/00 | (2006.01) |
| B60B 3/00 | (2006.01) |
| B60C 19/00 | (2006.01) |
| B60B 1/08 | (2006.01) |
| B60B 3/02 | (2006.01) |

(52) U.S. Cl.
CPC .............. B60B 21/026 (2013.01); B60B 1/06 (2013.01); B60B 3/005 (2013.01); B60B 17/0017 (2013.01); B60C 19/002 (2013.01); *B60B 1/08* (2013.01); *B60B 3/02* (2013.01); *B60B 2900/131* (2013.01); *B60B 2900/133* (2013.01)

(58) Field of Classification Search
CPC . B60B 2900/133; B60B 21/12; B60B 21/026; B60B 17/0017; B60B 1/06; B60B 3/005; B60C 19/002

See application file for complete search history.

(56) References Cited

U.S. PATENT DOCUMENTS

| | | | | |
|---|---|---|---|---|
| 6,106,075 | A * | 8/2000 | Suenaga | B60B 1/08 152/381.6 |
| 6,309,026 | B1 * | 10/2001 | Svedhem | B60C 19/00 152/209.2 |
| 6,375,118 | B1 * | 4/2002 | Kibens | F02K 1/34 244/1 N |
| 9,090,128 | B2 * | 7/2015 | Zhu | B60C 19/002 |

FOREIGN PATENT DOCUMENTS

| | | | | |
|---|---|---|---|---|
| JP | 2005-205934 | A | 8/2005 | |
| JP | 2010269679 | A * | 12/2010 | ............. B60B 21/04 |
| KR | 10-1541010 | B1 | 8/2015 | |

* cited by examiner

*Primary Examiner* — Scott A Browne  
(74) *Attorney, Agent, or Firm* — Morgan, Lewis & Bockius LLP

(57) ABSTRACT

A disc portion and a rim portion of a tire wheel are integrally formed simultaneously, with a resonance pipe formed between the disc and rim portions, by inserting a molten metal into a space formed by a mold combined with the resonance pipe by core pins.

5 Claims, 5 Drawing Sheets

TIRE WHEEL AND METHOD FOR MANUFACTURING THE SAME

CROSS-REFERENCE TO RELATED APPLICATION

This application is based on and claims the benefit of priority to Korean Patent Application No. 10-2017-0092510 filed on Jul. 21, 2017 with the Korean Intellectual Property Office, the entire contents of which are incorporated herein by reference.

TECHNICAL FIELD

The present disclosure relates to a tire wheel and a method manufacturing the same.

BACKGROUND

A tire of a vehicle typically plays roles of supporting a vehicle body, delivering a driving torque to vehicle body by interacting with a road surface, and absorbing and thus reducing impact delivered from the road surface to the vehicle body.

Such a tire is generally installed on a rim portion of the tire wheel.

A space is formed between the tire and the wheel, such that an acoustic wave, e.g., a noise, resonates in the space and produces a resonant sound while the vehicle is running. The produced resonant sound can be propagated into an interior of the vehicle and decrease a noise and vibration quality of the vehicle, thereby detreating a ride comfort of the vehicle for which the noise and vibration quality is one of key factors.

Therefore, technologies for reducing the resonant sound are being developed to enhance the ride comfort of the vehicle.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a tire wheel and a method manufacturing the same providing enhanced noise characteristic and improved durability.

A tire wheel for a vehicle according to an exemplary embodiment includes a disc portion, a rim portion, and a resonance pipe. The disc portion is configured to be mounted to the vehicle and forms a radially central and axially outermost face of the tire wheel. The rim portion is configured to mount a tire thereonto, integrally formed with the disc portion by molding, and forms a radially outer portion of the tire wheel. The resonance pipe is formed of a ring-shaped hollow pipe formed between the disc portion and the rim portion along a circumference of and in an interior of the tire wheel.

A plurality of sound absorbing holes that penetrates into an interior of the resonance pipe may be formed in the rim portion with being equally spaced along a circumference of the resonance pipe.

The resonance pipe may be made of a material having a melting point higher than a material of the disc portion and the rim portion.

The resonance pipe may be made of steel or a steel alloy material.

A method according to an exemplary embodiment is for manufacturing a tire wheel having a disc portion to be mounted to a vehicle and a rim portion to mount a tire thereonto. The method includes steps of combining a plurality of core pins with a resonance pipe of a ring-shaped hollow pipe, preheating the resonance pipe, combining the preheated resonance pipe to a mold through the plurality of core pins, inserting a molten metal into the mold such that the resonance pipe may be circumferentially formed between the disc portion and the rim portion and formed inside the tire wheel, and fabricating a plurality of sound absorbing holes that penetrate into the resonance pipe are equally spaced along a circumference of the rim portion.

The resonance pipe may be made of a material having a melting point higher than a material of the disc portion and the rim portion.

The resonance pipe may be made of steel or a steel alloy material.

The core pin may be made of titanium or a titanium alloy material.

According to an exemplary embodiment, a disc portion and a rim portion are integrally formed simultaneously and a resonance pipe is formed inside a wheel at the same time, thereby reducing manufacturing time and cost, and enhancing durability of a tire wheel.

Further, effects that can be obtained or expected from exemplary embodiments of the present disclosure are directly or suggestively described in the following detailed description. That is, various effects expected from exemplary embodiments of the present disclosure will be described in the following detailed description.

DETAILED DESCRIPTION

Hereinafter, exemplary embodiments of the present disclosure will be described with reference to the accompanying drawings. However, the drawings to be described below and the following detailed description relate to one preferred exemplary embodiment of various exemplary embodiments for effectively explaining the characteristics of the present disclosure. Therefore, the present disclosure should not be construed as being limited to the drawings and the following description.

A tire of a vehicle plays roles of supporting a vehicle body, delivering a driving torque to vehicle body by interacting with a road surface, and absorbing and thus reducing impact delivered from the road surface to the vehicle body.

The tire is installed on a rim portion of the tire wheel, and forms a space wave between the tire and the wheel where an acoustic wave, e.g., a noise, resonates to produce a resonant sound while the vehicle is running.

Such a resonant sound is propagated into an interior of the vehicle and decreases a noise and vibration quality of the vehicle.

A tire wheel and a method manufacturing the same according to an exemplary embodiment of the present disclosure may be employed to effectively reduce the resonant sound and improve durability of the wheel.

Figure 1:
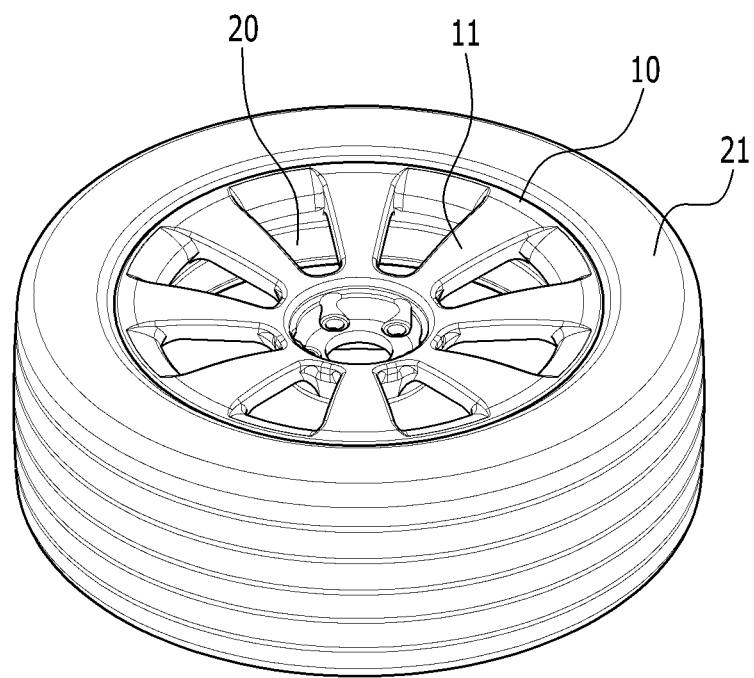
FIG. 1 is a perspective view of a tire wheel according to an exemplary embodiment of the present disclosure installed with a tire.
Figure 2:
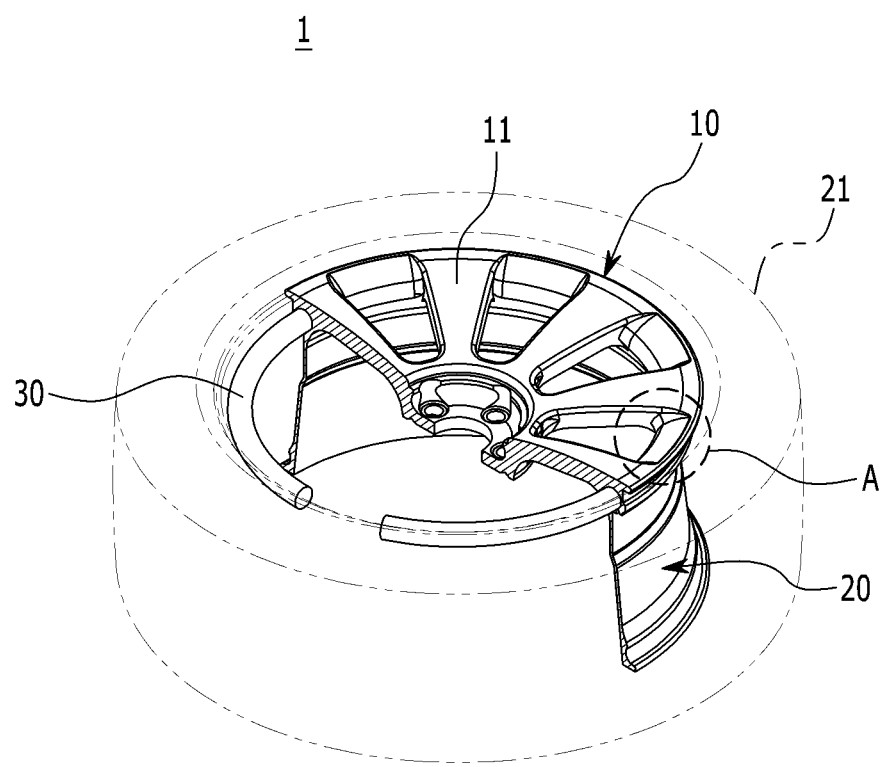
FIG. 2 is a partially cut-away perspective view of a tire wheel according to an exemplary embodiment of the present disclosure.
Figure 3:
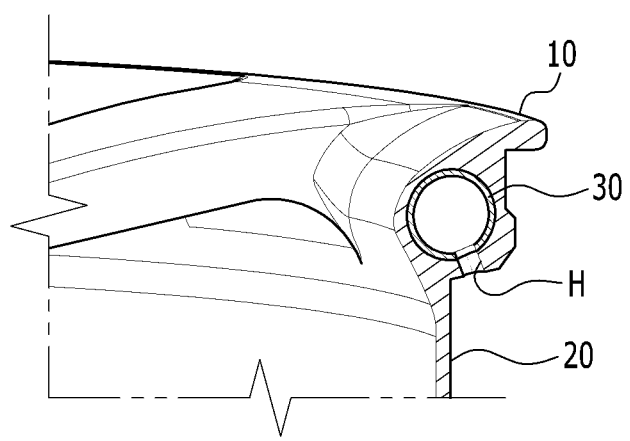
FIG. 3 is an enlarged sectional view of a portion A in FIG. 2.

FIG. 1 is a perspective view of a tire wheel according to an exemplary embodiment of the present disclosure installed with a tire. FIG. 2 is a partially cut-away perspective view of a tire wheel according to an exemplary embodiment of the present disclosure. FIG. 3 is an enlarged sectional view of a portion A in FIG. 2.

Referring to FIG. 1 and FIG. 2, a tire wheel 1 according to an exemplary embodiment of the present disclosure includes a disc portion 10, a rim portion 20 and a resonance pipe 30.

The disc portion 10 forms a radially central and axially outermost face of the tire wheel 1. A tire wheel 1 is mounted to a vehicle through the disc portion 10. In more detail, a center of the disc portion 10 is typically mounted to a wheel carrier (not shown) supported by a suspension system of the vehicle.

The disc portion 10 includes a plurality of spokes 11 that connects the center of the disc portion 10 to the rim portion 20. FIG. 1 and FIG. 2 illustrate that the plurality of spokes 11 are radially diverging to the rim portion 20, however, the present disclosure is not limited thereto. The plurality of spokes 11 may have various forms.

The rim portion 20 is formed in a generally cylindrical shape, and is integrally connected with the disc portion 10 at the radially exterior circumference of the disc portion 10.

A tire 21 is mounted on an exterior circumference of the rim portion 20.

General features of the disc portion 10 and the rim portion 20 are known in the art, and will not be described in further detail.

The resonance pipe 30 is formed between the disc portion 10 and the rim portion 20 along a circumference of and in an interior of the tire wheel 1.

The resonance pipe 30 is formed as a ring-shaped hollow pipe.

In vicinity of the resonance pipe 30, an air valve (not shown) is formed at the rim portion 20 so as to inflate the tire 21 mounted on the rim portion 21.

The resonance pipe 30 is made of a material having a melting point higher than a material of the disc portion 10 and the rim portion 20.

For example, the resonance pipe 30 may be formed of steel or a steel alloy material, however, the present disclosure is not limited thereto. It will be understood that the material of the resonance pipe 30 may be determined by an ordinarily skilled person considering materials of the disc portion 10 and the rim portion 20.

By forming the material of the resonance pipe 30 with a material of higher melting point than the disc portion 10 and the rim portion 20, the resonance pipe 30 may be protected from melting while the disc portion 10 and the rim portion 20 are simultaneously formed by an insert molding of molten metal into a mold such that the resonance pipe 30 is formed inside the tire wheel 1 between the disc portion 10 and the rim portion 20.

Referring to FIG. 3, a plurality of sound absorbing holes H that penetrates into an interior of the resonance pipe 30 are formed in the rim portion 20 with an equal spacing along a circumference of the resonance pipe 30.

A closed space having a small aperture may act as a Helmholtz resonator, where a waveform of a characteristic frequency inflowing into the space becomes to have a reversed phase when exiting the space. Thus, the sound absorbing holes H enable the resonance pipe 30 to act as a Helmholtz resonator for a predetermined resonance frequency, thereby cancelling a noise exterior to the resonance pipe 30.

The number of the sound absorbing holes H will not be critical in the present disclosure, and may be between three and eight.

The sound absorbing holes H may be formed by drilling, however, the present disclosure is not limited thereto.

Figure 4:
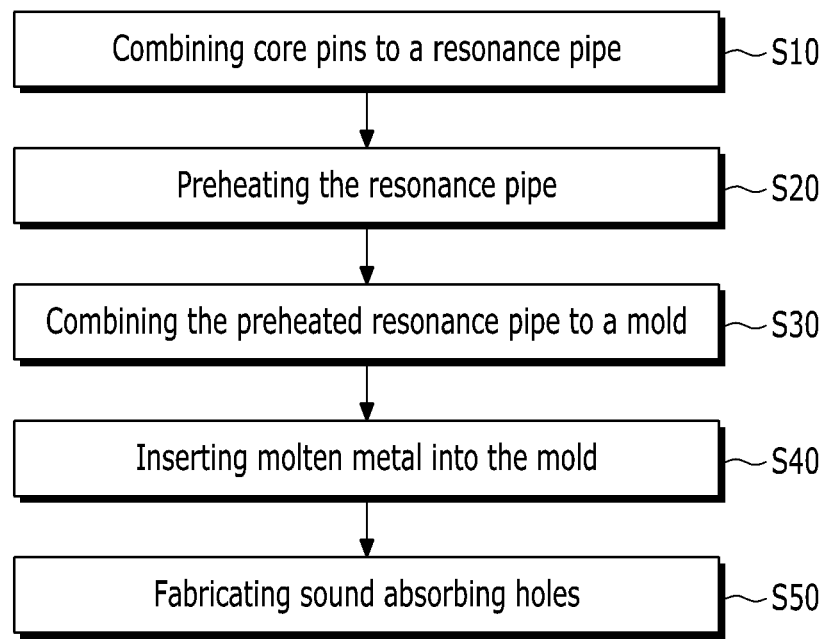
FIG. 4 is a flowchart of a method for manufacturing a tire wheel according to an exemplary embodiment of the present disclosure.

FIG. 4 is a flowchart of a method for manufacturing a tire wheel according to an exemplary embodiment of the present disclosure.

Figure 5:
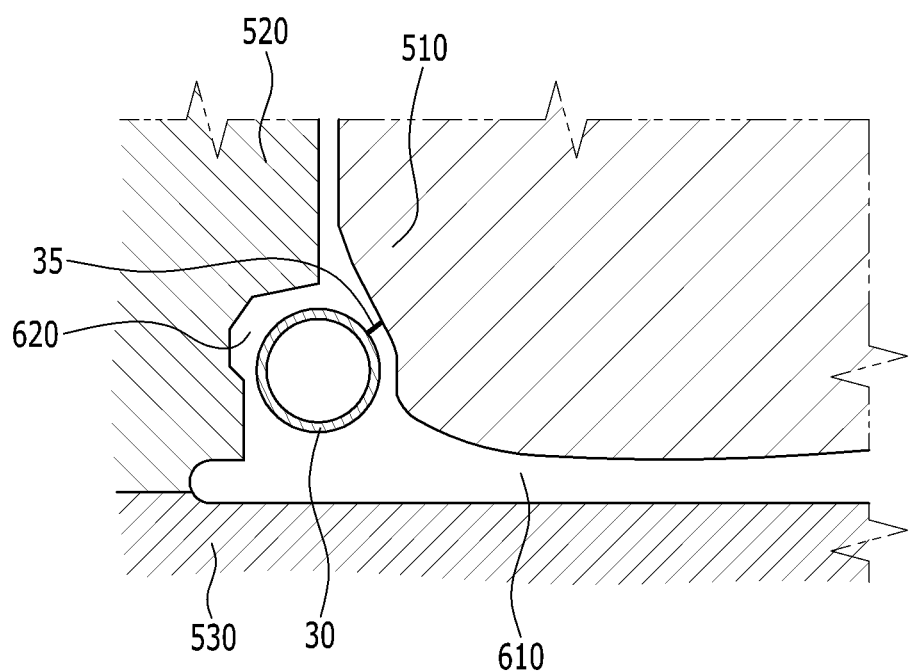
FIG. 5 is a sectional view illustrating a molding process of a method for manufacturing a tire wheel according to an exemplary embodiment of the present disclosure.

FIG. 5 is a sectional view illustrating a molding process of a method for manufacturing a tire wheel according to an exemplary embodiment of the present disclosure.

First, as shown in FIG. 4, a ring-shaped hollow pipe is prepared as the resonance pipe 30.

The resonance pipe 30 is made of a material having a melting point higher than a material of the disc portion 10 and the rim portion 20.

For example, the resonance pipe 30 is made of steel or a steel alloy material.

Subsequently at step S10, a plurality of core pins 35 are combined to the resonance pipe 30 as shown in FIG. 5.

The core pin 35 may be made of a material that is different from steel, and may be made of titanium or a titanium alloy material, for example.

Subsequently at step S20, the resonance pipe 30 combined with the core pins 35 is preheated.

By preheating the resonance pipe 30, a molten metal will have a small temperature difference with the resonance pipe 30 when the molten metal is inserted to a mold. Therefore, the disc portion 10 and the rim portion 20 may be strongly combined around the resonance pipe 30 without leaving vapors or other disadvantageous effects resulting from a sudden temperature decrease of the molten metal near the resonance pipe 30.

Subsequent at step S30, the preheated resonance pipe 30 is combined to a mold through the plurality of core pins 35 as shown in FIG. 5. FIG. 5 illustrates that the preheated resonance pipe 30 is combined to an interior mold 510, however, the present disclosure is not limited thereto. Depending on circumstances of manufacturing a tire wheel, the core pins 35 may be combined to the resonance pipe 30 at different locations and the resonance pipe 30 may be combined to an outer mold 520 or a lower mold 530.

By the molds 510, 520, and 530, a space 610 for the disc portion 10 and a space 620 for the rim portion 20 are formed as shown in FIG. 5

Although FIG. 5 illustrates that the spaces 610 and 620 are formed by three molds 510, 520, and 530, it should be understood that the present disclosure is not limited thereto, since the number or shapes of molds may be varied depending on manufacturing circumstances.

Subsequent at S40, a molten metal is inserted into the spaces 610 and 620 formed by the molds 510, 520, and 530.

By this process, the disc portion 10 and the rim portion 20 is formed around the resonance pipe 30. That is, the resonance pipe 30 becomes located in an interior of the tire wheel, between the disc portion 10 and the rim portion 20.

Finally at step S50, a plurality of sound absorbing holes H are fabricated through the rim portion 20 such that a plurality of sound absorbing holes penetrates the rim portion 20 and the resonance pipe 30 into an interior of the resonance pipe 30. The plurality of sound absorbing holes H may be formed with equal spacing along a circumference of the rim portion 20.

The sound absorbing holes H may be formed by drilling, and may be formed by a number between three and eight, for example.

A tire wheel 1 according to an exemplary embodiment described above is provided with a Helmholtz resonator through the sound absorbing holes H.

When a noise from a road surface flows into the resonance pipe 30 through the sound absorbing holes H while a vehicle is running, a noise having a specific frequency characteristic to the resonance pipe 30 is reversed, and thereby the noise having the characteristic frequency is cancelled.

Therefore, tire noise may be reduced by the resonance pipe 30.

According to a method for manufacturing a tire wheel according to an exemplary embodiment, the disc portion 10 and the rim portion 20 are integrally formed simultaneously by inserting a molten metal into a mold, thereby simplifying manufacturing process and reducing manufacturing cost.

A method for manufacturing a tire wheel according to an exemplary embodiment does not require a procedure of welding separately fabricated rim and disc portions of a tire wheel, thereby reducing possibility of air leakage between the welded rim and disc portions and accordingly increasing durability of the tire wheel.

A method for manufacturing a tire wheel according to an exemplary embodiment provides more design degree of freedom for the disc portion 10 and the rim portion 20, since the resonance pipe 30 is separately prepared and combined to a mold.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A tire wheel for a vehicle, comprising:
a disc portion configured to be mounted to the vehicle and forming a radially central and axially outermost face of the tire wheel;
a rim portion configured to mount a tire thereonto, the rim portion integrally formed with the disc portion by molding, and forming a radially outer portion of the tire wheel; and
a resonance pipe of a ring-shaped hollow pipe formed between the disc portion and the rim portion along a circumference of and in an interior of the tire wheel,
wherein the resonance pipe, which is a separate element from the rim portion and the disc portion, is completely surrounded by the integrally formed rim and disc portions,
a plurality of sound absorbing holes that penetrate into an interior of the resonance pipe are disposed in the rim portion, and
the resonance pipe includes a material having a melting point higher than a material of the disc portion and the rim portion.

2. The tire wheel of claim 1, wherein the plurality of sound absorbing holes are equally spaced along a circumference of the resonance pipe.

3. The tire wheel of claim 1, wherein the resonance pipe is made of steel or a steel alloy material.

4. A tire wheel for a vehicle, comprising:
a disc portion configured to be mounted to the vehicle and forming a radially central and axially outermost face of the tire wheel;
a rim portion configured to mount a tire thereonto, the rim portion integrally formed with the disc portion by molding, and forming a radially outer portion of the tire wheel; and
a resonance pipe of a ring-shaped hollow pipe formed between the disc portion and the rim portion along a circumference of and in an interior of the tire wheel,
wherein a bead seat of the rim portion onto which a portion of the tire is disposed overlaps the resonance pipe in a radial direction of the tire wheel, and
an axially-outwardly located portion adjacent to a cavity of the rim portion where the resonance pipe is arranged is defined by the rim portion itself.

5. A tire wheel for a vehicle, comprising:
a disc portion configured to be mounted to the vehicle and forming a radially central and axially outermost face of the tire wheel;
a rim portion configured to mount a tire thereonto, the rim portion integrally formed with the disc portion by molding, and forming a radially outer portion of the tire wheel; and
a resonance pipe of a ring-shaped hollow pipe formed between the disc portion and the rim portion along a circumference of and in an interior of the tire wheel,
wherein the resonance pipe, which is a separate element from the rim portion and the disc portion, is completely surrounded by the integrally formed rim and disc portions,
a plurality of sound absorbing holes that penetrate into an interior of the resonance pipe are disposed in the rim portion,
the resonance pipe includes a material having a melting point higher than a material of the disc portion and the rim portion,
a bead seat of the rim portion onto which a portion of the tire is disposed overlaps the resonance pipe in a radial direction of the tire wheel, and
an axially-outwardly located portion adjacent to a cavity of the rim portion corresponding to the resonance pipe is defined by the rim portion itself.

* * * * *